C. G. TIEFEL.
CHECK PROTECTOR.
APPLICATION FILED OCT. 2, 1919.

1,372,323.

Patented Mar. 22, 1921.
6 SHEETS—SHEET 1.

INVENTOR
CHARLES G. TIEFEL.
BY
ATTORNEY

C. G. TIEFEL.
CHECK PROTECTOR.
APPLICATION FILED OCT. 2, 1919.

1,372,323.

Patented Mar. 22, 1921.
6 SHEETS—SHEET 4.

INVENTOR
CHARLES G. TIEFEL
BY
ATTORNEY

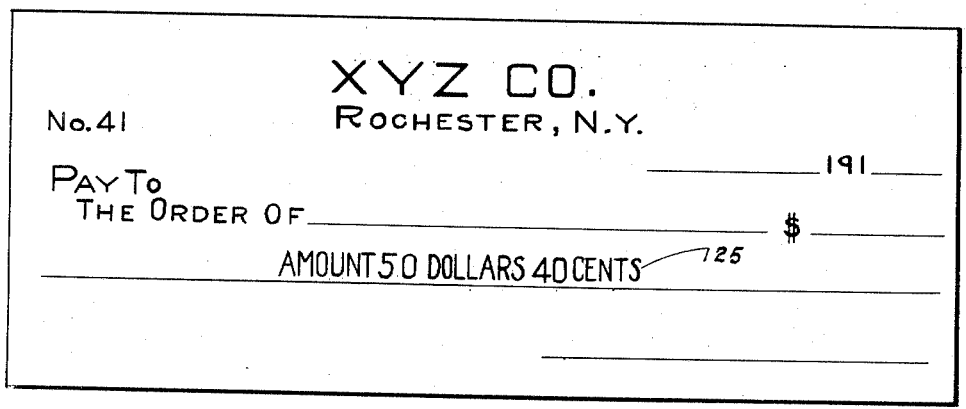
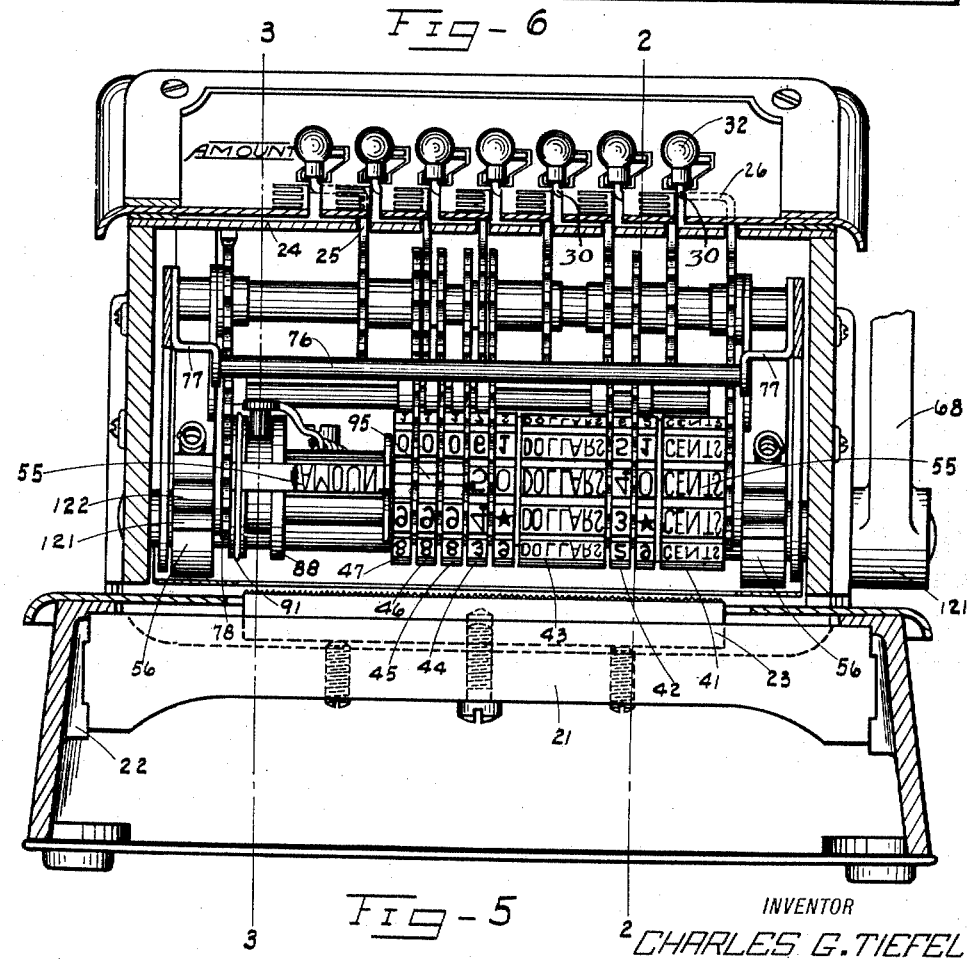

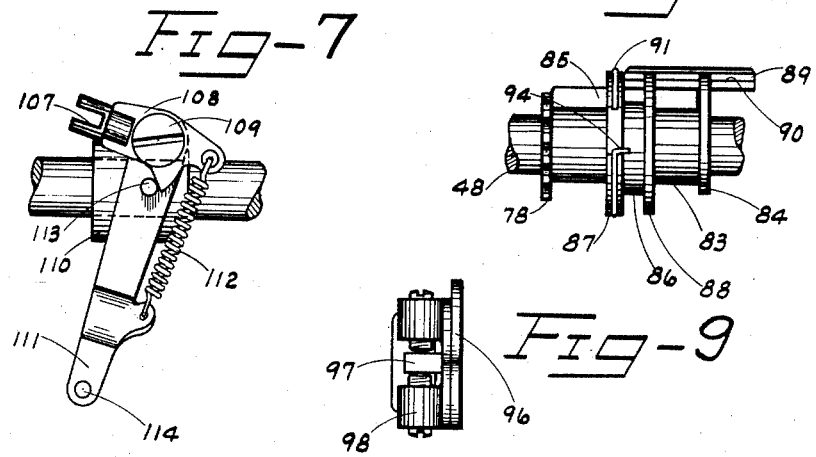
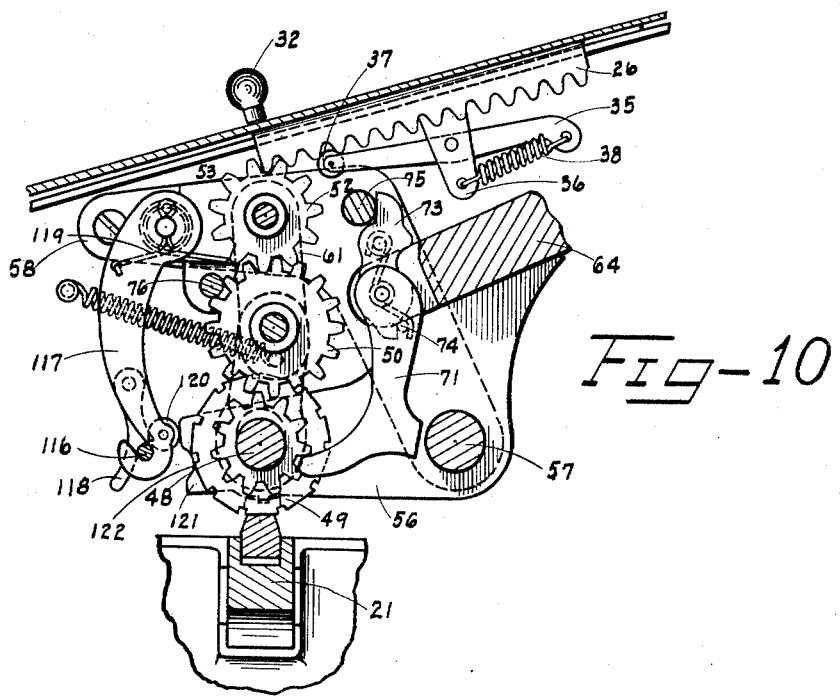

UNITED STATES PATENT OFFICE.

CHARLES G. TIEFEL, OF FAIRPORT, NEW YORK, ASSIGNOR TO TODD PROTECTOGRAPH COMPANY, OF ROCHESTER, NEW YORK, A CORPORATION OF NEW YORK.

CHECK-PROTECTOR.

1,372,323.  Specification of Letters Patent.  Patented Mar. 22, 1921.

Application filed October 2, 1919. Serial No. 328,023.

*To all whom it may concern:*

Be it known that I, CHARLES G. TIEFEL, a citizen of the United States, residing at Fairport, in the county of Monroe and State of New York, have invented certain new and useful Improvements in Check-Protectors, of which the following is a specification.

This invention relates to printing or marking devices and has particular reference to what are known as check protectors because they are intended primarily for use in printing the values upon checks and similar documents in such a way as to render alteration difficult.

Such machines to do effective work must at all times be supplied with the right amount of ink and an object of the invention is to provide a machine which is simple and compact in its construction, but which includes means for keeping the type uniformly inked during a large number of operations.

The illustrative machine shown in the accompanying drawings is one of the kind in which a set of type carriers may be separately adjusted to set up the matter to be printed by subsequent operation of an operating mechanism. Different numbers of type carriers are employed in printing the amounts depending upon the lengths or number of denominational orders in the amounts. Another object of the invention is to provide such machines with an improved mechanism for printing a limiting word or other matter in close relation with the characters representing the amount or other value regardless of the number of orders in the amount.

A more specific object is to provide an improved mechanism for inking and operating a logotype for printing the limiting word. The term "logotype" is used herein for the reason that it describes the word printing type carrier shown in the drawings, but the matter to be printed is not of the essence of the invention and instead of a word printing type carrier a type form to print arbitrary characters, dates, initials, firm names and the like may be employed.

Another object is to provide a construction whereby a number of different logotypes may be supplied with a machine, with means in the machine whereby any desired one of the logotypes may be inserted and fastened in position in such a way that a change can readily be made at any time and a corresponding change made in the keyboard.

The machine in the drawings has a keyboard including manually operable racks to set the type carriers and the type carriers are in the form of wheels and constructed to print figures. As will be better understood later, however, the improvements can be embodied in machines which have series of keys for controlling the type carriers and in which the type carriers are in the form of bars or constructed to print the values in words.

With the above and incidental objects in view, the invention consists in the novel construction and arrangement of parts, a preferred form of embodiment of which is hereinafter described with reference to the accompanying drawings and the features of novelty of which are pointed out in the claims appended hereto.

Of said drawings:—

Fig. 5 is a section on the line 5—5, Fig. 2.

Fig. 6 shows the matter that would be printed on a check if the type carriers are adjusted as shown in Fig. 5 and the operating mechanism operated.

Fig. 7 is a detail of some of the connections for sliding the logotype to print in different positions along a printing line.

Fig. 8 is a detail of some of the mechanism for supporting and operating the logotype with the logotype in a shifted position.

Fig. 9 is a detail of the cam for sliding the logotype and the devices immediately associated therewith for adjusting the cam to control the movements of the logotype.

Fig. 10 shows the positions of the parts when the type carriers have been moved into engagement with the platen.

Figure 1:
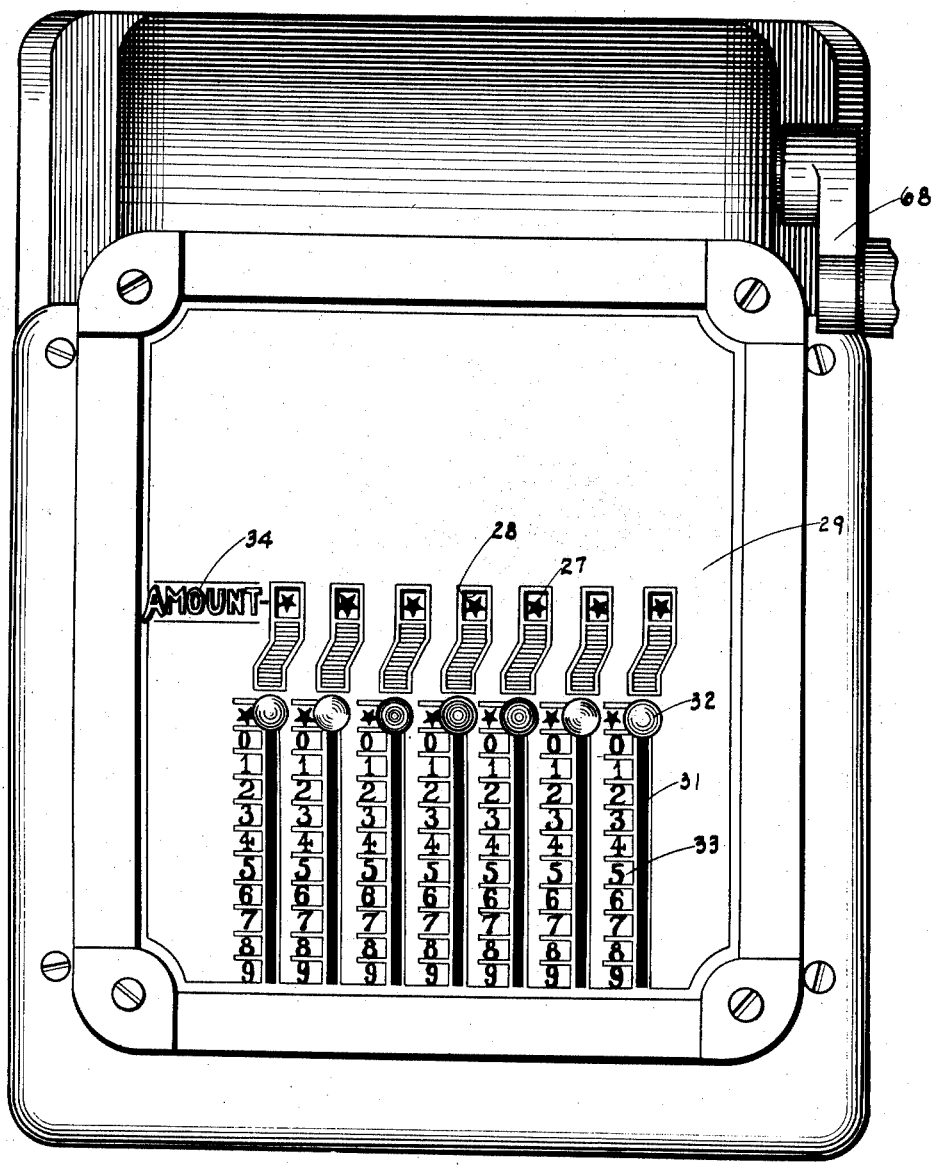
Figure 1 is a top plan view of the assembled machine and shows particularly the arrangement of the keyboard.

The machine in the drawings has seven value type carriers giving a printing capacity up to $99,999.99. The units of dollars and units of cents are provided respectively with type for printing the words Dollars and Cents in each of the positions of the wheels. The key board mechanism comprises a setting rack for each type carrier operating through intermediate gearing to turn the type carriers to print the desired amounts.

After the amount has been set up an operating device is operated to carry the type toward a platen to effect printing. The devices intermediate the type carriers and the setting racks are so constructed that the movement of the type carriers toward the platen will cause a second partial rotation of the type carriers. This is to turn the type carriers from a position where ink may be applied to a position opposite the platen. Ink is applied to the type to be printed from near the beginning of the movement of the operating mechanism. A logotype which, in the present instance, is constructed to print the word "Amount" is carried by supporting devices rotatable on the same axis as the value type carriers and is turned simultaneously with the value carriers as they are turned from inking to printing position.

The supporting devices for the logotype are not only capable of turning as just referred to, but the construction is such that the logotype may be shifted in a direction parallel to the axis of rotation. The higher order value type carriers are cut away at their home or normal positions to receive the logotype and when it is shifted it moves through these cut away portions until it strikes against the side of the highest order carrier which is set to print a value. The result is that the word represented by the logotype may be printed in close relation with the left hand figure of the amount regardless of the number of figures in the amount. After the impression has been made and during the return movement of the type carriers, the logotype is returned to its original position on its rotary support and the support turned back to the inking line ready for the next operation.

Ink is applied to the type by an ink roll carried by supports which normally hold the roll out of inking relation with the type, but as soon as the type carriers begin to turn from inking to printing position the ink roll is allowed to swing toward the type carriers to ink all of the type previously adjusted to the inking position. The inking mechanism is designed to ink only the type printed from and to permit the use of a large inking roll or pad in constructions where the type and platen have only a short relative movement to effect impressions.

Describing the machine in detail and with reference to the drawings, the mechanism is inclosed in a casing comprising a rectangular hollow base 15 and an upper portion 16. These two portions of the casing, which may be integral, are separated at the front by a work receiving slot 17 terminating at its inner end at an opening 18 across which extends a shield 19 of tubular form. At its outer ends the tubular opening is surrounded by loosely mounted elements 20 as shown and described in pending U. S. application No. 244,246, filed July 10, 1918 by Nelson White and C. G. Tiefel. As described in that application, the elements 20 permit free movement of large sheets when thrust in through the slot 17 and automatically roll the work up in the machine. Owing to their being loosely mounted on their supports, the elements 20 automatically adjust themselves to accommodate the gradually increasing diameter of the roll of paper as it is rolled up, thereby preventing any tendency to bind and prevent free insertion of the work.

Extending across the base 15 is a bar 21 supported at its ends in brackets 22 on the side walls of the base and adjustably mounted in a groove in the top of the bar 21 is a platen 23.

The forward part of the top of the casing 16 is inclined and is closed by a plate 24 slotted as at 25 to receive and permit free endwise movement of racks 26. Integral with each rack 26 is a horizontal portion resting upon the top of the plate 24. These horizontal portions are provided with indicating characters 27 showing through small openings 28, Fig. 1, in an index plate 29. Rigid with the horizontal portions of the rack members are arms 30, Fig. 5, extending through slots 31 in the index plate 29 and provided at their outer ends with knobs 32 whereby the racks may be moved to different positions with reference to scales 33 on the index plate. As shown at 34, Fig. 1, the index plate bears the word "Amount" at the left of the line of indicator openings 28 so that after the knobs 32 have been operated to set the racks 26, the indicating line will show substantially what the machine is to print, the main difference between the indication and the printing being that in the printing there will be no gap between the printed word "Amount" and the highest significant character of the amount.

The knobs 32 are screwed on the arms 30 so that they may be readily removed, one purpose being to make it easy for a user to remove the plate 29 and substitute a plate bearing some other word in the place of "Amount" in case the machine is to be used for some purpose where that word would not be pertinent or desirable. As hereinafter explained, a corresponding change may easily be made in the type for printing the word represented by the indication. It is apparent, of course, that the word "Amount" or its equivalent may be carried by a small plate detachably secured to the index plate 29 so that the change can be made without substituting an entire index plate 29.

Coöperating with the racks 26 are devices for retaining the racks in different positions to which they may be adjusted. These devices are in the form of levers 35, Fig. 10, centrally pivoted on downwardly extending portions of brackets 36 secured to the underside of the plate 24. The forward ends of the levers are provided with cylindrical members 37 which may be rotatable on the arms and which engage the teeth of the racks 26. Springs 38 at all times hold the cylindrical members 37 in firm engagement with the racks, thereby serving not only to hold the racks in adjusted positions, but also automatically to impart a slight movement to the racks, if, in adjusting them manually, they are stopped a little out of correct position.

Figure 2:
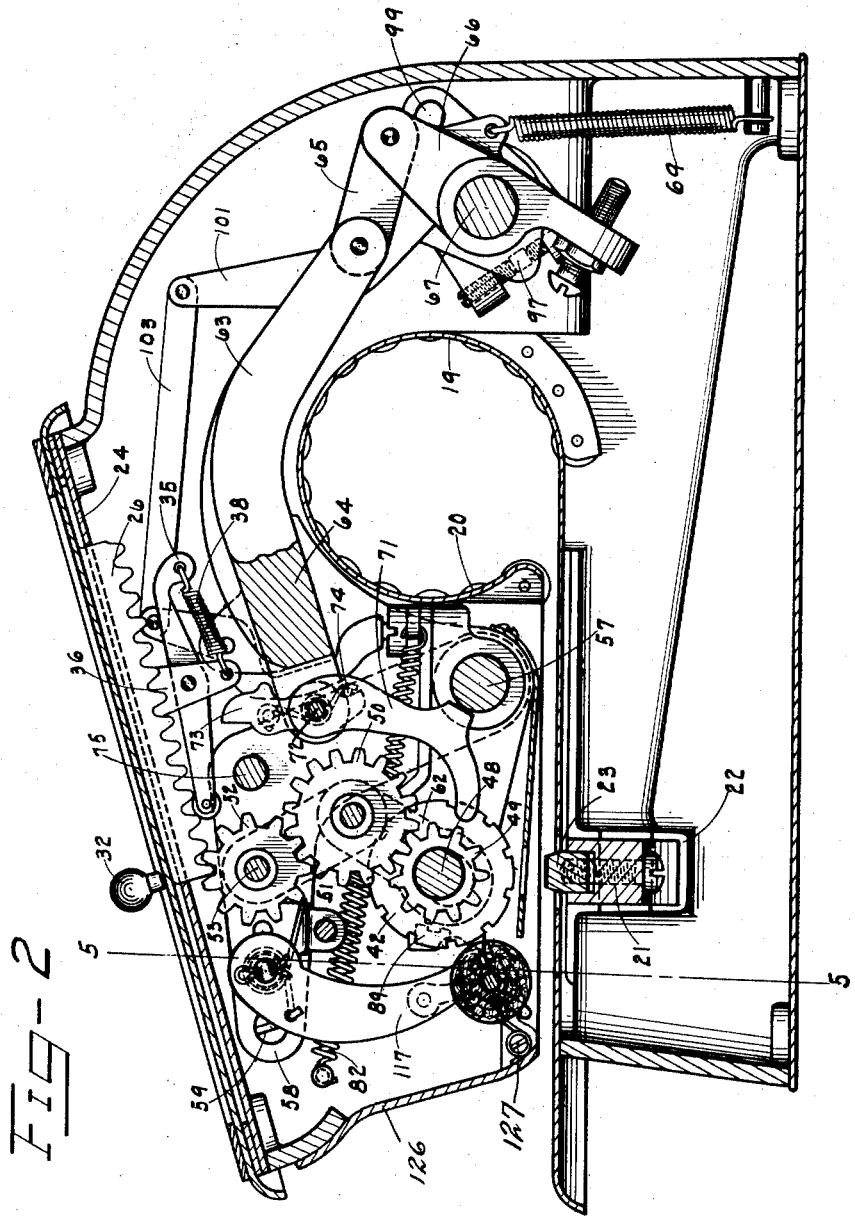
Fig. 2 is a section on the line 2—2, Fig. 5.

As will be seen in Figs. 1 and 5, the illustrative machine has seven of the setting racks 26 and for each of these there is provided a type carrier, numbered from 41 to 47 inclusive, all rotatably mounted upon a rod 48. Integral with each of the type carriers is a gear 49 (Figs. 2 and 4) meshing with an intermediate gear 50 journaled on a rod 51, the intermediate gears in turn meshing with smaller gears 52 journaled on a rod 53. Certain of the gears 52 are, as shown in Fig. 5, rigid with other gears of the same size and rotating on the same center and meshing with the teeth of the racks 26 corresponding to the associated type carriers, the purpose of this being to permit a satisfactory arrangement of the setting slides with reference to the key board. This double gear construction need not be described in detail because such arrangements are well known in the art and the connections may easily be traced by referring to Figs. 4 and 5. It is sufficient to state that when a rack 26 is moved from one position to another the associated type carrier is rotated to a corresponding position, thereby making it possible to set up at an inking line 55, Fig. 5, the matter which it is desired to print.

The rod 48 on which the type carriers are mounted is supported at its ends in the side arms 56 of a large yoke carried by a rod 57 fastened in the side walls of the casing. The rod 53 is supported in mounting plates 58 secured to the side walls of the casing by screws 59 and held by the rods 53 and 57. The rod 51 carrying the intermediate gears 50 is supported at its ends by links 61 and 62 loose on the rods 53 and 48 and pivotally connected by the rod 51. It is apparent that if the side arms 56 of the yoke move to carry the type carriers down to engage the type with the platen 23 the connection afforded by the links 61 and 62 will be straightened as shown in Fig. 10 and that this, on account of the fact that the racks 26 are held by the retaining devices 35, will cause the gears 50 to have a planetary movement around the gears 52 thereby causing the gears 50 to turn the type carriers. The gearing between the type carriers and racks is so proportioned that the downward printing movement of the type carriers will cause the carriers to turn approximately one-quarter of a rotation.

The mechanism for effecting the movement of the side arms 56 of the yoke to carry the type carriers down to print comprises a rearwardly extending arm 63 integral with a cross portion 64 of the yoke and connected at its rear end by means of a link 65 to an arm 66 fastened to a rock shaft 67. Secured to the outer right hand end of the shaft 67 is an operating handle 68 by means of which the shaft may be rocked against the tension of a return spring 69. When the shaft 67 is rocked the arm 66 and link 65 will rock the yoke on its support 57 to move the type carriers down against the platen and incidentally effect the planetary movement of the intermediate gears 50 to turn the type carriers from inking to printing position. The connection afforded by the arm 66 and link 65 is such that the type and platen may exert a very heavy pressure and the type and platen may be constructed to shred or mutilate the paper and thereby cause the ink to penetrate the fiber and make erasure impossible.

At about the time that the type carriers pass into engagement with the platen they are latched against movement in either direction. This is accomplished by a series of latching arms 71 suitably formed to engage between the teeth of the type carrier gears. The arms 71 are pivoted on a rod 72 mounted in the type carrying yoke and normally rest against the rod 57. Adjacent each arm 71 and pivoted on the rod 72 is a short upwardly extending arm 73. Torsion springs tend at all times to swing the arms 71 and 73 in opposite directions but this is normally prevented by the engagement of the lower ends of the arms 73 with pins 74 secured to the sides of the arms 71. When the type carrying yoke is swung to carry the type down the arms 71 and 73 are moved bodily until the arms 71 are in engagement with the teeth of the type carrier gears and the arms 73 are in contact with a rod 75 supported by the mounting plates 58. The spring connection between the arms 71 and 73 permits a relative movement of the arms in case a type carrier gear should be a little out of correct position, thereby preventing breakage of the parts. At the same time the springs are strong enough to impart adjusting movement to the type carrier gears thereby insuring correct alinement of the type carriers before printing.

When the type carriers are moved into engagement with the platen the gearing connecting the type carriers and the setting racks is, as before stated, moved to the position shown in Fig. 10. In that position the type carrier gears 49 are partially disengaged from the intermediate gears 50, although the meshing relation is maintained. However, to prevent any accidental displacement of the intermediate gears while the type carrier gears are partially disengaged therefrom, the printing movement of the type carriers and consequent movement of the intermediate gears causes the intermediate gears to be engaged with a rod 76 supported at its ends in brackets 77 fastened to the mounting plates 58. The intermediate gears are, therefore, always held in correct position to be reëngaged by the type carrier gears as the type carrier yoke raises the carriers to their normal positions. Springs 82 serve to assist in effecting the planetary movement of the gears 50 and holding them in engagement with the alining rod 76.

Rotatably mounted on the shaft 48 supporting the type carriers is a gear 78 (Figs. 5 and 8) of the same size as the gears rigid with the type carrier gears 48. This gear 78 meshes with an intermediate gear 79, Fig. 3, like the intermediate gears 50 and the intermediate gear 79 in turn meshes with a gear 80 like the gears 52. The gear 80 instead of being engaged by an adjustable rack engages a stationary lug or tooth 81 on the under side of the plate 24. As the gears 78, 79 and 80 are supported respectively by the rods 48, 51 and 53, it is apparent that the gear 78 will be rotated in the same direction and to the same angular extent as the type carriers 41 and 47, when the type carriers are moved into engagement with the platen.

Figure 3:
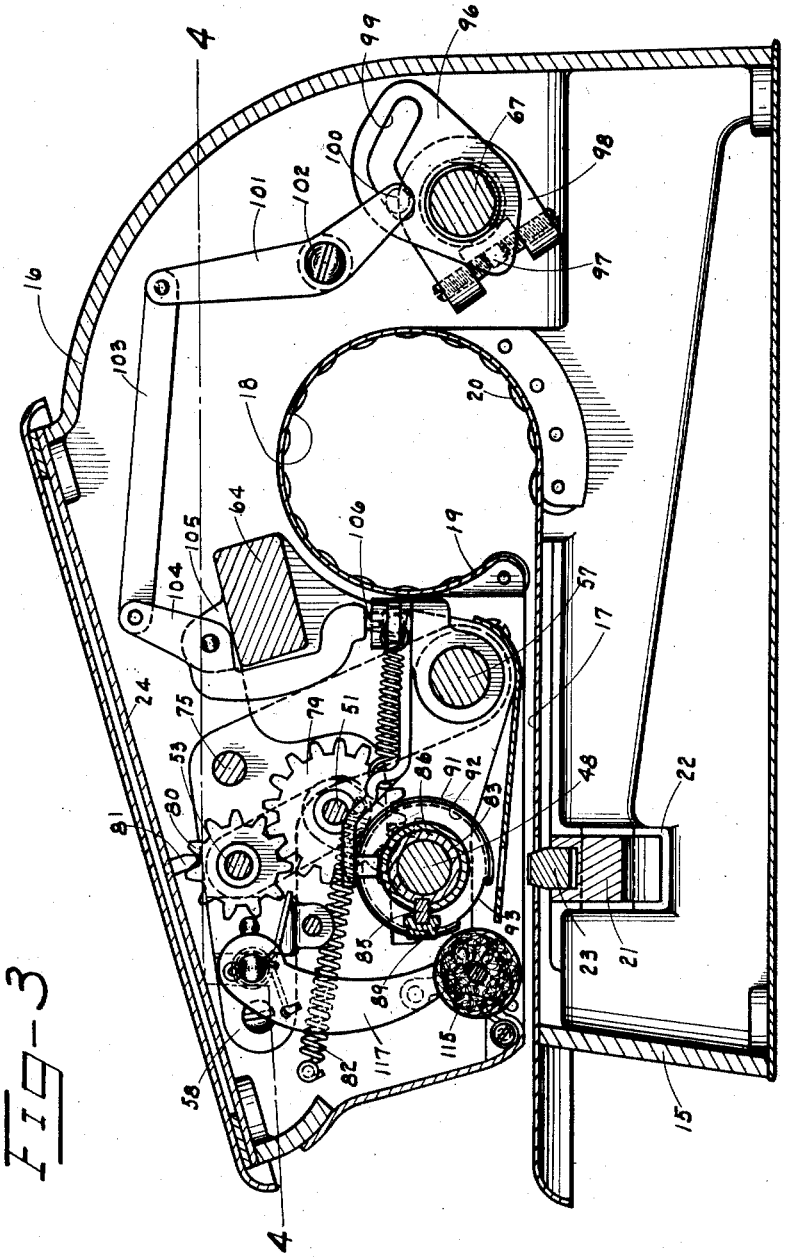
Fig. 3 is a section on the line 3—3, Fig. 5.

Rigid with the gear 78 is a sleeve 83 loose on the rod 48 and having secured to its other end a disk 84. Fastened to the sleeve 83 between the gear 78 and disk 84 is a bar 85 parallel with the axis of the sleeve. Loose on the sleeve 83 is an element comprising a sleeve 86 to which are secured disks 87 and 88. The sleeve 86 and the disks 87 and 88 are cut away, as shown in Fig. 3, to clear the bar 85 and permit sliding movement, the bar preventing rotation of the disks 87 and 88 relative to the sleeve 83. The cut away portions in the disks 84, 88 and 87 also receive the logotype 89 and are formed to coöperate with ribs 90 on the sides of the logotype so that the logotype may slide through the cuts while any other movement of the logotype relative to the disks is prevented. The underside of the logotype 89 is grooved to coöperate with the bar 85, the bar 85 being provided to give a firm support for the logotype in printing.

As before stated in a general way, the present invention contemplates the supplying of logotypes for printing different words or other matter, in connection with mechanism whereby one may be removed from the machine and another inserted. The sliding engagement of the logotype with the disks 84, 88 and 87 has already been explained, but it has not been made clear that the only time the logotype slides relative to the disks 87 and 88 is when it is being inserted or removed. When it is inserted in proper position it is retained in that position by a wire spring 91, Figs. 3 and 8, fitting in a groove 92 around the periphery of the disk 87. The periphery of that disk is cut away as shown at 93 and one end of the wire spring 91 is bent laterally as shown at 94 to coöperate with one end of the cut away portion. To insert a logotype this bent end of the spring is engaged by any convenient tool and the wire spring slid around the disk 87 as far as permitted by the cut 93. This will carry the other end of the spring 91 clear of the logotype receiving cut in the disk 87. The logotype is then slid into position in the disks and the retaining member 91 returned to its original position. As it is returned it will be engaged with a groove, not shown, in the logotype, thereby preventing endwise movement of the logotype relative to the disks 87 and 88.

As before pointed out, when the type carriers move toward the platen they are turned about one-fourth of a revolution so as to carry the type set at the inking line 55 into position to coöperate with the platen. The gearing connecting the logotype gear 78 with the stationary tooth 81 will, as before indicated, give a corresponding movement to the logotype so that it will move in unison with the other type carriers to carry its type to the printing line. As this movement is being effected, the logotype is also moved endwise to extents determined by the number of higher order type carriers which are at their normal or unadjusted positions. In Fig. 5, the type carriers 45, 46 and 47 are unadjusted and at their unadjusted positions, the three higher order carriers have clearances or cut away portions 95 to receive the logotype and the logotype will move through these cuts into contact with the first type carrier which has no cut in alinement with the logotype. The construction is such that by the time the value type carriers and logotype have been turned to present their type in printing relation with the platen the logotype will have been slid toward the right ready to print the word "Amount" in close relation to the left hand figure of the amount.

The mechanism for effecting the sliding or shifting movement of the logotype is actuated by a cam 96, Figs. 3 and 9, loose on the rock shaft 67. Secured to the side of the cam is a stud 97 coöperating with adjusting screws in an element 98 secured to the shaft 67. The adjusting screws permit setting the cam 96 in different positions relative to the shaft 67, thereby controlling the extent of movement of the mechanism actuated by the cam.

Figure 4:
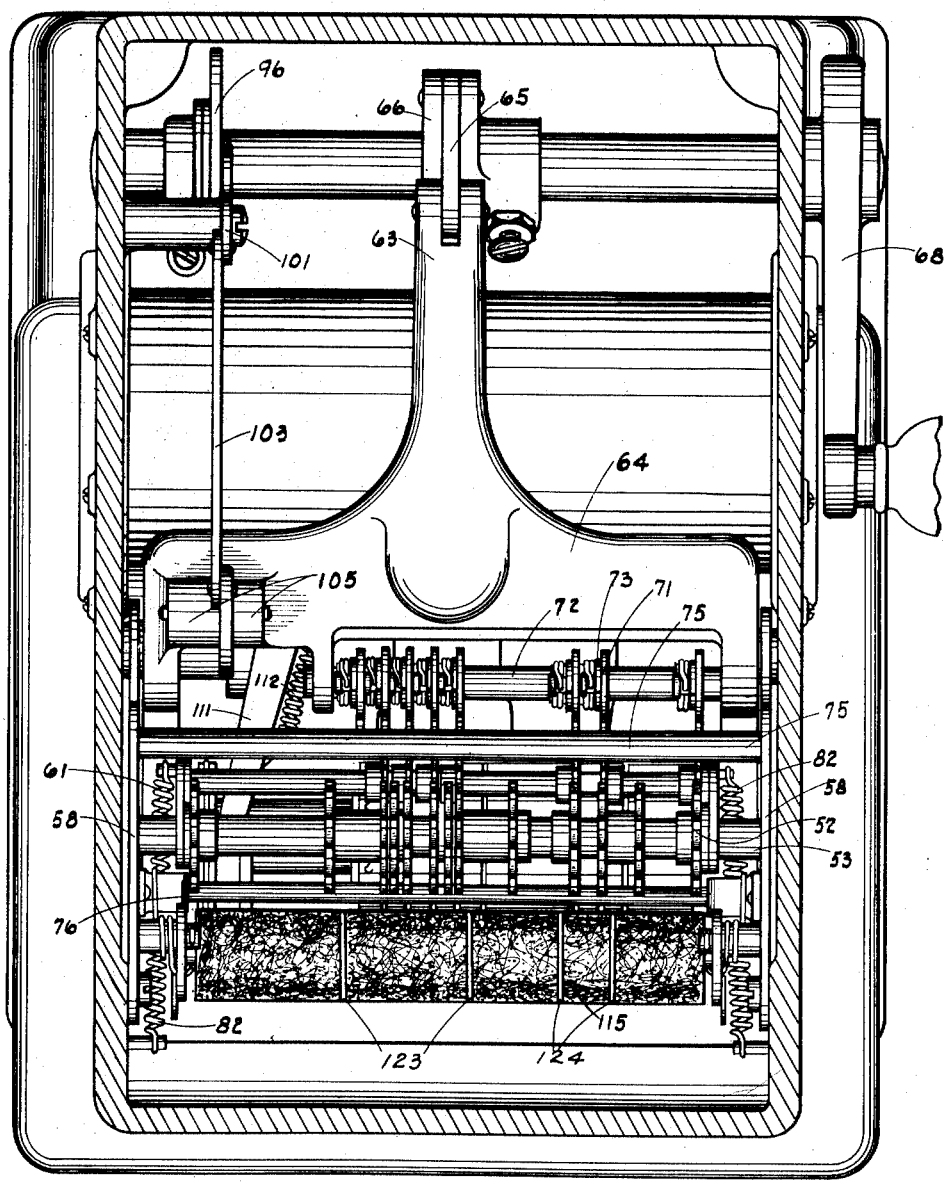
Fig. 4 is a section on the line 4—4, Fig. 3, with certain of the parts projecting from the plane on which the section is taken.

The slot 99 in the cam engages a stud 100 on a lever 101 pivoted on a stud 102 secured to the side wall of the casing. The upper end of the lever 101 is connected by a link 103 to a lever 104 pivotally supported between ears 105 on the cross bar 64 of the type carrier yoke. The lower end of the lever 104 has a stud 106 engaging a slot 107, Fig. 7, in an element 108 which is pivoted on a screw 109 in a bracket 110 fastened to the rod 57. Pivoted on the screw 109 is an arm 111. A spring 112 tends at all times to rotate the arm 111 and element 108 in opposite directions, but this is prevented by the coöperation of a stud 113 with a shoulder on the element 108. At its forward end the arm 111 carries a downwardly projecting stud 114 engaging between the disks 87 and 88 supporting the logotype. When the rock shaft 67 is operated the cam slot 99 swings the lower end of the lever 104 forward thereby swinging the element 108 and arm 111 counterclockwise, Fig. 7, and sliding the logotype to the right, Fig. 5, until it is arrested by the first type carrier having no clearance in position to receive it. When it is arrested the rest of the invariable movement of the cam operated mechanism will be absorbed by the spring 112. As the cam slot 99 returns the parts to normal position, the shoulder on the element 111 will be brought into engagement with the stud 114 and the logotype slid back to its normal position, this sliding movement occurring while the type carriers are being rotated back to their inking position. The ink is carried by an inking roll 115 of felt or other absorbent material and is large enough to hold a considerable supply of ink. The ink roll is carried on a shaft 116, see Fig. 10, engaging hooks on the lower ends of arms 117. Latches 118 engage the shaft 116 and prevent it from becoming disengaged from the hooks. Springs 119 tend at all times to swing the lower ends of the arms toward the type carriers but contact of the inking roller with the type is normally prevented by the side arms 56 of the type carrier supporting yoke. The forward ends of the side arms 56 coöperate with rollers 120 mounted on the inking arms 117. In the normal positions of the parts, the portions 121 on the side arms are in engagement with the rollers 120 but as the side arms are swung down cuts 122 come in coöperation with the rollers and allow the inking arms to swing in as the type to be printed from leave the inking line. Further movement of the side arms swings the inking arms forward to carry the inking roller out of contact with the type, thereby preventing the application of ink to type which are not to be printed from. Upon the return of the type carrier supporting yoke to its original position the operation of the inking mechanism is reversed so that at the end of the operation, the inking roller will be held out of contact with the type and thereby permit free movement of the type. The inking roll 115 may, if desired, be composed of a number of sections each containing ink of a different color, the sections of the roller being separated by metal disks as shown at 123 and 124 (Fig. 4). In the preferred form the inking roller is so constructed that the words Amount, Dollars and Cents will be printed in black and the digits in red. A door, 126, Fig. 2, hinged at 127 and extending the width of the machine, gives ready access to the ink roll and type carriers.

In describing the illustrative machine it has been necessary incidentally to describe to a certain extent the operation of the various parts of the mechanism. However, the operation as a whole may be summarized briefly by pointing out the different manipulations and movements of parts in printing the line shown at 125, Fig. 6. That line, it will be noted, reads Amount 50 dollars 40 cents.

To prepare the machine to print the amount in question the units of cents knob 32 is moved from the neutral or blank position to "0" and the tens of cents knob is moved to the "4" position. The units of dollars is then moved from neutral to "0" and the tens of dollars from neutral to the "5" position. This movement of the knobs operates through the racks 26, gears 52, 50 and 49 to impart a corresponding degree of rotation to the type carriers 41, 42, 43 and 44 so that when the adjustment of the knobs is completed, the type carriers will be positioned as shown in Fig. 5 with the type to print 50 dollars 40 cents at the inking line 55. The type carriers 45, 46 and 47 will remain at the neutral position with the cuts 95 therein in alinement with the sliding logotype 89.

The operating handle 68 is then moved to rock the shaft 67 thereby swinging the type carrier yoke on its axis 57 to carry the type carriers toward the platen 23. The downward movement of the type carriers will rotate the gears 50 around the gears 52 and effect rotation of all of the type carriers from the inking line 55 to a position directly above the platen 23. The logotype is also turned at the same time through the train of gearing shown in Fig. 3 owing to the fact that the position of the gear 80 is fixed by the stationary tooth 81. The rest of the forward movement of the operating handle will force the type against the platen.

As the amount type carriers and logotype are rotated from inking to printing positions as just described, the cam 99 acts through the intervening connections to slide the logotype relative to its supporting devices until its movement is interrupted by engagement with the side of the type carrier 44. The logotype will be held in that position while the impression is being made. As the type carriers are moved away from the platen during the back stroke of the operating handle the logotype is withdrawn to its original position, that is, the position in which it is shown in Fig. 5.

As the type carriers start in their movement toward the platen the notches 122 in the side arms 56 of the type carrier yoke are carried past the rollers 120 on the inking arms 117, thereby allowing the inking roll to contact the type at the inking line to supply the necessary ink for printing. After the printing is effected and during the return movement of the type carriers to the inking lines, the inking roll again contacts the type to replace the ink used in printing.

While the illustrative machine herein shown and described is admirably adapted to fulfil the objects primarily stated, it is not the desire to be limited to the one form of embodiment, as the invention is capable of various modifications and changes all coming within the scope of the claims which follow.

What is claimed is:

1. In a machine of the class described, the combination with a series of type carriers adjustable to set up amounts at an inking position, a platen, operating mechanism for effecting a relative movement of the type carriers and platen to print, devices controlled by the operating mechanism for applying ink to the type set at inking position, and means actuated by the operating mechanism for adjusting the type carriers to move the inked type into position to coöperate with the platen.

2. In a machine of the class described, the combination with manipulative devices, of a series of adjustable type carriers, a platen, operating mechanism for effecting a relative movement of the type carriers and platen to print, means requiring operation of the manipulative devices and actuation of the operating mechanism to adjust the type carriers in position for the desired type to coöperate with the platen, and inking mechanism controlled by the operating mechanism for applying ink to the type before they reach the printing position.

3. In a machine of the class described, the combination with a series of adjustable setting racks, of a series of adjustable type carriers, a platen, operating mechanism for bringing the type carriers and platen together to print, means requiring adjustment of the setting racks and operation of the operating mechanism for adjusting the type carriers to set the desired type at printing position, and inking mechanism controlled by the operating mechanism for inking the type before they reach the printing position.

4. In a machine of the class described, the combination with a series of manually adjustable setting racks, of a series of differentially rotatable type carriers, a platen, operating mechanism for bringing the type carriers and platen together to print, means requiring adjustment of the setting racks and operation of the operating mechanism for rotating the type carriers to set the desired type in position to coöperate with the platen, and inking mechanism controlled by the operating mechanism for applying ink to the type to be printed from as the type move to printing position opposite the platen.

5. In a machine of the class described, the combination with a series of manually adjustable setting racks, of a series of differentially rotatable type carriers, a platen, operating mechanism for moving the type against the platen to print, means requiring adjustment of the setting racks and operation of the operating mechanism for rotating the type carriers from inking position to set the desired type in position to coöperate with the platen, and normally ineffective inking mechanism for applying ink to the selected type before printing, said inking mechanism being rendered effective near the beginning of the movement of the operating mechanism.

6. In a machine of the class described, the combination with a series of manually adjustable setting racks, of a series of differentially rotatable type carriers, a platen, operating mechanism for moving the type toward and from the platen to print, means requiring adjustment of the racks and printing movement of the type carriers to rotate the type carriers to position the desired type in printing relation with the platen, and mechanism controlled by the operating mechanism for inking the type to be printed from.

7. In a machine of the class described, the combination with a series of manually operable setting elements, of a series of differentially rotatable type carriers, a platen, operating mechanism for moving the carriers toward and from the platen, devices for differentially rotating the type carriers by movements of the setting elements and for giving the carriers a second partial rotation as the carriers move toward the platen, and means controlled by the operating mechanism for applying ink to the type to be printed from, 8. In a machine of the class described, the combination with a series of differentially movable setting racks, of a series of differentially adjustable type carriers, a platen, operating mechanism for effecting a relative printing movement of the platen and type carriers, devices for transmitting movements of the setting racks to the type carriers to effect type selection and giving the carriers a second movement at operation of the operating mechanism to bring the selected type in printing relation with the platen, and inking mechanism operated at the beginning of the operation of the operating mechanism for inking the selected type.

9. In a machine of the class described, the combination with a series of setting racks, of a series of type carriers, a platen, means for moving the type carriers toward the platen to print, devices intermediate the racks and type carriers for transmitting movements of the racks to the carriers and for giving the carriers a second movement as the carriers move toward the platen, and mechanism for inking the type which are to be printed from during the second movement of the carriers.

10. In a machine of the class described, the combination with a series of setting racks, of a series of type carriers, a platen, connections for transmitting movement of the racks to the type carriers, said connections also being operable to adjust the carriers relative to the racks from set position to printing position, devices for applying ink to the type to be printed from before they reach the printing position, and an operating mechanism for effecting a relative printing movement of the type carriers and platen to print and effecting operation of the aforesaid connections to move the carriers to the printing position.

11. In a machine of the class described, the combination with a series of manually operable setting racks, of a series of differentially rotatable type carriers, a platen, connections for rotating the type carriers by movement of the racks to set up amounts, said connections also being operable to rotate the carriers relative to the racks from set position to printing position, devices for applying ink to the type before they reach printing position, and an operating mechanism for effecting a relative printing movement of the type carriers and platen to print and effecting operation of the aforesaid connections to rotate the carriers to printing position.

12. In a machine of the class described, the combination with a series of differentially movable setting racks, of a series of differentially adjustable type carriers, a platen, operating mechanism for effecting a relative printing movement of the platen and type carriers, devices for transmitting movements of the setting racks to the type carriers to effect type selection and giving the carriers a second movement at operations of the operating mechanisms to position the selected type in printing relation with the platen, inking mechanism operated near the beginning of the operation of the operating mechanism for inking the selected type, and means for retaining the type carriers in printing position until the impression is taken.

13. In a machine of the class described, the combination with a series of differentially movable setting racks, of a series of differentially adjustable type carriers, a platen, operating mechanism for effecting a relative printing movement of the platen and type carriers, devices for transmitting movements of the setting racks to the type carriers to effect type selection and giving the carriers a second movement at operations of the operating mechanisms to position the selected type in printing relation with the platen, inking mechanism operated near the beginning of the operation of the operating mechanism for inking the selected type, and means moved into engagement with the type carriers after they reach the printing position for holding them against movement until the printing is effected.

14. In a machine of the class described, the combination with a series of differentially adjustable setting racks, of means for retaining them in adjusted positions, a series of differentially adjustable type carriers, gears meshing with the setting racks, gears integral with the type carriers, a floating support, gears rotatable on said support and meshing both with the rack gears and the type carrier gears, operating devices for effecting a printing movement of the type carriers relative to the setting racks, and supports for the aforesaid floating support movable by the operation of the operating devices to maintain meshing relation of the gears.

15. In a machine of the class described, the combination with a series of differentially adjustable setting racks, of means for retaining the racks in adjusted positions, a series of differentially rotatable type carriers, gears meshing with the setting racks, gears rigid with the type carriers, a floating shaft, intermediate gears on said shaft and meshing both with the rack gears and the type carrier gears, operating devices for effecting a printing movement of the type carrier relative to the setting racks, and supports for the aforesaid shaft movable by operation of the operating devices to maintain meshing relation of all of the gears.

16. In a machine of the class described, the combination with a series of differentially movable racks, of differentially rotatable type carriers, gearing connecting the racks and type carriers comprising a set of gears bodily movable relative to the racks to impart a movement to the type carriers separate from the movement imparted by the racks, a platen, operating mechanism for effecting movement of the type carriers toward the platen and movement of the aforesaid gears relative to the racks, and devices controlled by the operating mechanism for inking the type during the second movement of the carriers.

17. In a machine of the class described, the combination with manipulative devices, of a series of differentially adjustable value printing type carriers, means controlled by said manipulative devices for adjusting the value type carriers to set up amounts of different lengths at an inking line, a logotype normally held at the inking line and constructed to print a designation for the value, devices for inking the type set at the inking line, mechanism for turning the type carriers from inking to printing position, and mechanism for moving the designation printing character toward the adjusted carriers different extents depending upon the number of unadjusted type carriers.

18. In a machine of the class described, the combination with manipulative devices, a series of differentially adjustable value printing type carriers, means controlled by said manipulative devices for separately adjusting the value type carriers to set up amounts of a varying number of denominational orders at an inking line, a type carrier normally held at the inking line and constructed to print a designation for the value, devices for inking the type as they move away from the inking line, mechanism for automatically rotating all of the type carriers from inking to a printing position, and connections actuated at operations of said mechanism for moving the designation carrier different extents depending upon the number of denominational orders in the value to be printed as the carriers are being turned to printing position.

19. In a machine of the class described, the combination with a key board, of a series of selectively and differentially rotatable value printing type carriers, means controlled by the key board for rotating the value carriers to set up desired values at an inking line, a type carrier normally held at the inking line and constructed to print a designation for the value, devices for inking the type set at the printing line, mechanism for simultaneously turning the type from inking to a printing position, and devices for moving the designation printing carrier toward and from the adjusted carriers different extents depending upon the number of value carriers to be printed from.

20. In a machine of the class described, the combination with a series of type carriers adjustable to set up amounts of different lengths at an inking position, a type carrier normally held at the inking position and bearing type for printing a limiting word, devices for inking all of the type set at the inking line, a platen, mechanism comprising an invariably moved shaft for moving the carriers to bring the inked type in position to coöperate with the platen, and connections actuated by the operating shaft for moving the designation printing type carrier toward the value carriers different extents depending upon the length of the amount to be printed.

21. In a machine of the class described, the combination with a series of type carriers differentially rotatable to set up amounts of different lengths at an inking position, a type carrier normally held at the inking position and bearing type for printing a limiting word, devices for inking the type at the inking position, a platen, operating mechanism comprising an invariably moved shaft for simultaneously rotating all of the type carriers to bring the inked type in position to coöperate with the platen, and connections actuated by the operating shaft for moving the designation printing type carrier toward the amount type carriers different extents depending upon the length of the amount to be printed.

22. In a machine of the class described, the combination with a series of type carriers differentially rotatable to set up amounts of different lengths at an inking position, a type carrier normally held at the inking position and bearing type for printing a designation for the amount, a platen, operating mechanism comprising an invariably moved shaft for rotating all of the type carriers to bring the type at inking position into position to coöperate with the platen, devices controlled by the operating mechanism for applying ink to the type at the inking position, and connections actuated by the operating shaft for shifting the designation printing type carrier laterally to print in close relation to the left hand character of the amount regardless of the length of the amount.

23. In a machine of the class described, the combination with a rotatable element, of a type carrying member slidable on said element, and devices comprising an invariably moved element and a variably moved element for effecting rotation of the element and sliding movement of the member.

24. In a machine of the class described, the combination with an element movable to different positions along a printing line and means for effecting said movements, of a logotype detachably supported by the element.

25. In a machine of the class described, the combination with an element movable to different positions along a printing line and means for effecting and controlling said movements, of a set of interchangeable logotypes, and means for removably securing a logotype to the element.

26. In a machine of the class described, the combination with an element rotatable from an inking to a printing position, of a member slidable in an axial direction on said element, a logotype moving with the member, and means for imparting the movements to the element and member.

27. In a machine of the class described, the combination with an element rotatable from an inking to a printing position, of a member slidable in an axial direction on said element, a logotype detachably mounted on the member, and mechanism for rotating the element and sliding the member.

28. In a machine of the class described, the combination with an element movable to different positions along a printing line and mechanism for effecting and controlling said movements, of a logotype set on said element, and a manually operable detent for securing the logotype to the element.

29. In a machine of the class described, the combination with a set of type carriers individually and differentially adjustable to set up items of different lengths at an inking line, of an element differentially adjustable laterally to extents determined by the adjustment of the type carriers, a logotype detachably secured to said element, devices for inking the logotype and type at the inking line, impression taking mechanism, and connections for operating the inking mechanism and effecting the lateral adjustment of the aforesaid element at operations of the impression taking mechanism.

30. In a machine of the class described the combination with a set of type carriers adjustable to set up items of various lengths at a printing line, of an element movable to set it at different positions along the printing line, a logotype removably secured to the element, impression taking mechanism, and means actuated by said mechanism and controlled by the type carriers for effecting the setting movements of the aforesaid element.

31. In a machine of the class described, the combination with a set of type carriers adjustable to set up the items of various lengths at a printing line, of an element movable to set it at different positions along said line, a logotype detachably fastened to the element, impression taking mechanism, means actuated by said mechanism and controlled by the type carriers for effecting the setting movements of the aforesaid element, and an exterior casing covering the mechanism and provided with an opening through which the logotype may be detached.

32. In a machine of the class described the combination with a set of type carriers adjustable to set up items of various lengths at a printing line, of an element movable to set it at different positions along said line, a logotype detachably fastened to the element, impression taking mechanism, means actuated by said mechanism and controlled by the type carriers for effecting said movements of the aforesaid element, an exterior casing covering the mechanism and provided with an opening through which the logotype may be detached, and a closure for said opening.

33. In a machine of the class described a series of type carriers independently and differentially adjustable to set up amounts in dollars and cents, the units of dollars and units of cents carriers having in alinement with each digit type a logotype for printing the word "Dollars" or "Cents," and means for setting the type carriers to print the different amounts desired.

34. In a machine of the class described, the combination with digit type carriers, of a logotype movable to print in different positions according to the number of denominational orders in the amount to be printed a logotype for the word "Dollars" in alinement with each digit on the units of dollar type carrier, a logotype on the units of cents type carrier in alinement with each digit to print the word "Cents" after said digit, means for moving the aforesaid logotype to different positions along the printing line as determined by the adjustment of the type carriers, and inking mechanism constructed to apply ink of one color to the aforesaid movable logotype and to the "Dollars" and "Cents" logotypes and ink of another color to the digit type.

In testimony whereof I hereby affix my signature.

CHARLES G. TIEFEL.